No. 881,085.

PATENTED MAR. 3, 1908.

J. A. SHIRES.
MUSIC NOTATION.
APPLICATION FILED APR. 22, 1907.

UNITED STATES PATENT OFFICE.

JOSEPH A. SHIRES, OF DENVER, COLORADO.

MUSIC-NOTATION.

No. 881,085.    Specification of Letters Patent.    Patented March 3, 1908.

Application filed April 22, 1907. Serial No. 369,703.

*To all whom it may concern:*

Be it known that I, JOSEPH A. SHIRES, a citizen of the United States, residing in the city and county of Denver and State of Colorado, have invented certain new and useful Improvements in Music-Notation; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in music notation, or a new arrangement for vocal music.

The object of my invention is to simplify or facilitate the reading of music.

The invention consists of replacing notes by words or syllables of a song and placing over each word or syllable a numeral which designates the length of tone.

Having briefly outlined my improved system, I will proceed to describe the same in detail reference being made to the accompanying drawing in which is illustrated an embodiment thereof.

In this drawing, Figure 1 is an illustration of my improved notation. Fig. 2 is a modified form thereof.

In Fig. 1 I have shown a staff comprising seven bars arranged to properly accommodate a line of the hymn "Nearer My God to Thee". The words of this song take the place of the regular musical symbols. They are placed each in its proper position on said staff whereby the proper tone of each word or syllable is indicated. Thus the symbols of the ordinary music as B and A in the above hymn are replaced by the syllables near-er respectively. Just above the words or syllables are placed numerals to designate the length of tone, thus the word "Near-er" has placed above the same the numerals 3 and 2, 3 designating the number of beats to the syllable "near" and 2 the number of beats to the syllable "er."

In Fig. 2 the second line or bass words are made heavier or darker so that distinction can be readily drawn. When there are more than two parts, say soprano, alto and bass the parts may be written in three different shades. With my improved arrangement it is needless for a person to spend a great deal of time in learning to read music as the length of tone is designated by the numerals, and the tone by the position of the words and syllables.

Having thus described my invention, what I claim is:

1. In a system of music notation, a staff, words positioned on said staff, and numerals positioned on said staff above the words for the purpose set forth.

2. In a system of music notation, a staff, words positioned on the staff to indicate the tones, and numerals also positioned on said staff designating the length of tone, the various music parts being written in different shades for the purpose set forth.

In testimony whereof I affix my signature in presence of two witnesses.

JOSEPH A. SHIRES.

Witnesses:
DENA NELSON,
MAY GAWLEY.